United States Patent
Sivasankaran et al.

(10) Patent No.: US 7,602,705 B1
(45) Date of Patent: *Oct. 13, 2009

(54) DUAL-HOMING LAYER 2 SWITCH

(75) Inventors: Dileep Sivasankaran, Fremont, CA (US); Frank S. Madren, Los Gatos, CA (US)

(73) Assignee: Garrettcom, Inc., Fremont, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/356,902

(22) Filed: Feb. 17, 2006

Related U.S. Application Data (60) Provisional application No. 60/726,331, filed on Oct. 12, 2005.

(51) Int. Cl.
*G01R 31/08* (2006.01)

(52) U.S. Cl. ....................... 370/218; 370/225
(58) Field of Classification Search ................. 370/235, 370/216–228
See application file for complete search history.

(56) References Cited

U.S. PATENT DOCUMENTS

| | | | |
|---|---|---|---|
| 4,490,785 A | * | 12/1984 | Strecker et al. ............. 710/100 |
| 5,892,772 A | | 4/1999 | Hauris et al. |
| 5,949,872 A | | 9/1999 | Khalil et al. |
| 6,982,953 B1 | * | 1/2006 | Swales ....................... 370/218 |
| 7,308,715 B2 | * | 12/2007 | Gupta et al. .................. 726/23 |
| 2003/0161275 A1 | * | 8/2003 | Malhotra et al. ............ 370/256 |
| 2004/0085894 A1 | * | 5/2004 | Wang et al. .................. 370/216 |
| 2005/0245127 A1 | * | 11/2005 | Nordin et al. ............ 439/540.1 |
| 2006/0193246 A1 | * | 8/2006 | Brute De Remur et al. . 370/216 |

* cited by examiner

*Primary Examiner*—Seema S. Rao
*Assistant Examiner*—Mon Cheri S Davenport
(74) *Attorney, Agent, or Firm*—Okamoto & Benedicto LLP (57) ABSTRACT

One embodiment relates to a method of providing dual-homing in a layer 2 switch. A determination is made as to whether a link is available to an upstream network on for a currently active port. If the link is unavailable, then the layer 2 switch a) performs a switchover such that the currently active port becomes a newly passive port, and a currently passive port becomes a newly active port, b) clears entries in an address table of the layer 2 switch, and c) spoofs MAC addresses out of the newly active link. Other embodiments are also disclosed.

22 Claims, 8 Drawing Sheets

```
begin
    set_passive_link(LINK_2);        ◄─────── 304
    set_active_link(LINK_1);         ◄─────── 302
    clear_addr_table;
    init_soft_addr_table;
    active = LINK_1;
    passive = LINK_2;
    while true
    {
        link1 = read_link(active);           ◄─────── 306
        if(link1 = LINK_UP) continue;        ◄─────── 308
        else                                 ◄─────── 310
        {
            set_passive_link(active);    ⎫
            set_active_link(passive);    ⎬ 312
            interchange(active,passive); ⎭
            init_clear_addr_table;               ◄─────── 314
            address = get_first_addr;
            while(address)                                 ⎫
            {                                              ⎪
                send_spoof(address);                       ⎬ 316
                address = get_next_addr;                   ⎪
            }                                              ⎭
            init_soft_addr_table;
        }
    }
}
```

DUAL-HOMING LAYER 2 SWITCH

CROSS-REFERENCE TO RELATED APPLICATIONS

The present application claims the benefit of U.S. provisional patent application No. 60/726,331, filed Oct. 12, 2005, by inventors Dileep Sivasankaran and Frank S. Madren, entitled "Dual-Homing Layer 2 Switch," the disclosure of which is hereby incorporated by reference.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates generally to networking. More particularly, the present invention relates to layer 2 (typically, ethernet) networking.

2. Description of the Background Art

Designing and implementing high-availability Ethernet LAN topologies in industrial networks is challenging. While ring and mesh topologies are coming into more general use, finding practical ways to provide for recovery from faults for edge devices and nodes is difficult. While devices such as computers can be configured with two NICs for dual connections into the network, the software is complex. For industrial sensors and controllers, very few PLCs and IEDs are designed by their manufacturer to be equipped with such a feature. In addition, the serial field buses that have been traditionally used for industrial control do not offer fault-tolerant options, and industrial systems designers are not accustomed to planning for redundancy for control devices. The choices have been too limited and too expensive and too complicated to be considered in most industrial systems.

SUMMARY

One embodiment relates to a method of providing dual-homing in a layer 2 switch. A determination is made as to whether a link is available to an upstream network on for a currently active port. If the link is unavailable, then the layer 2 switch a) performs a switchover such that the currently active port becomes a newly passive port, and a currently passive port becomes a newly active port, b) clears entries in an address table of the layer 2 switch, and c) spoofs MAC addresses out of the newly active link.

Other embodiments are also disclosed.

DETAILED DESCRIPTION

The present application discloses a novel dual-homing technology for small Industrial Ethernet Switches. This dual-homing technology is being implemented in the new Magnum™ ESD42 Switches by Garrettcom, Inc. of Fremont, Calif. The Magnum™ ESD42 Switches provide dual-homing for redundancy at the edge of the network for any attached nodes. The Magnum™ ESD42 Switches are unmanaged plug-and-play for simplicity, hardened and rugged for use in any industrial environment, physically small (about the size of your fist) to fit into any package, have MTBFs (mean time before failures) over 25 years for reliability, and are low in cost. Redundancy at the edge of industrial networks is now easily accomplished using such switching technology.

Figure 1:
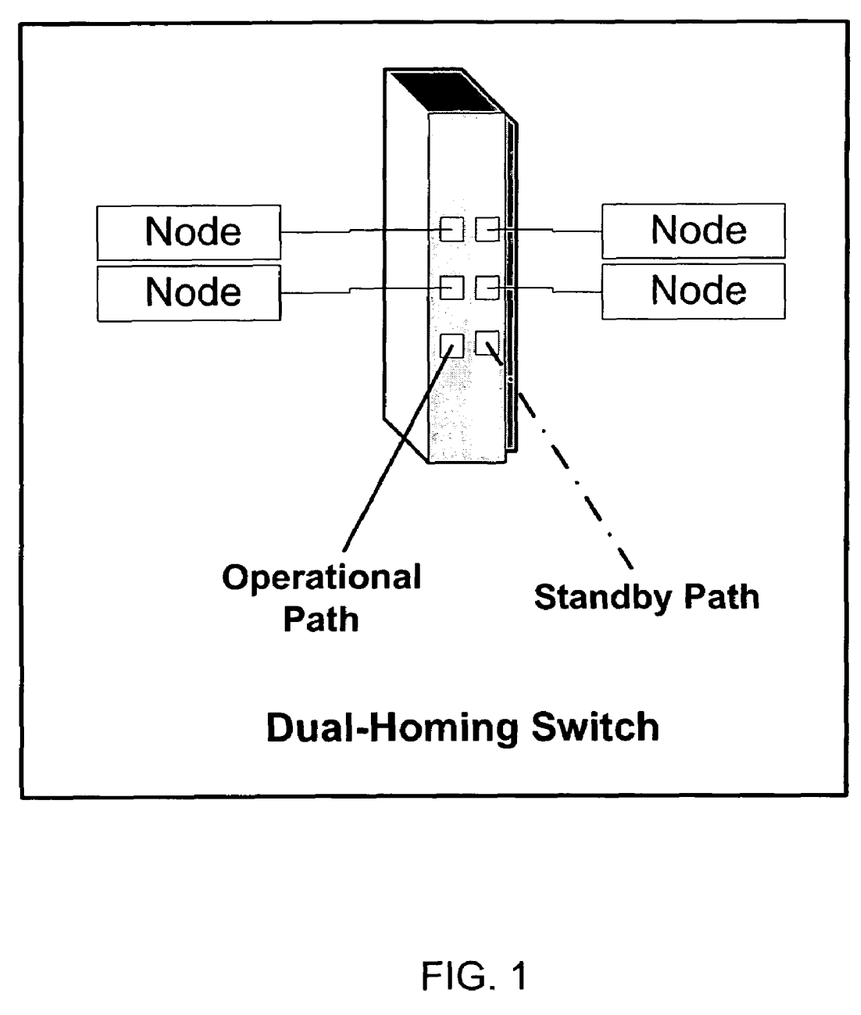
FIG. 1 depicts a dual-homing switch configured in a network topology in accordance with an embodiment of the invention.

In Ethernet LANs (local area networks), dual-homing is a network topology in which a device is connected to the network by way of two independent access points (points of attachment). Such a network topology is illustrated in FIG. 1. As depicted in FIG. 1, one access point (the currently active port) is the operating connection to the "upstream" network, and the other (the currently passive port) is a standby or back-up connection to the upstream network that is activated in the event of a failure of the operating connection. Other ports of the switch may be connected "downstream" to various network nodes.

Advantageously, dual-homing adds reliability by providing a backup connection if the operating link fails. Because a dual-homing switch has two attachments into the network, you have two independent media paths and two upstream switch connections available. Using dual-homing, only one of the two attachment paths is active at a time. Loss of the Link signal on the operating port indicates a fault, and traffic is quickly moved to the standby connection to accomplish a fault recovery.

Figure 2:
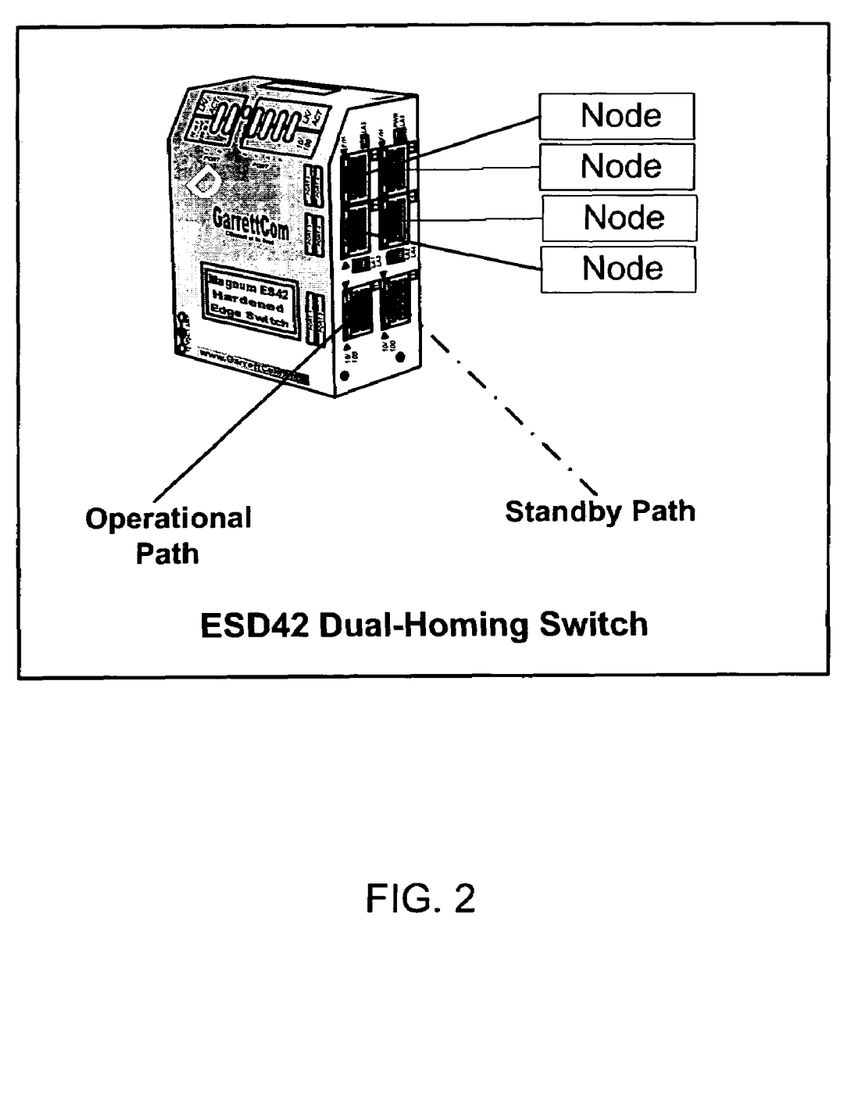
FIG. 2 depicts a Magnum™ ESD42 dual-homing switch configured in a network topology in accordance with a specific embodiment of the invention.

FIG. 2 depicts a Magnum™ ESD42 dual-homing switch configured in a network topology in accordance with a specific embodiment of the invention. In the Magnum™ ESD42 Dual-Homing Switch, the two dual-homing ports (port numbers 1 and 2) are peers. When the ESD42 is powered up, port 1 is initially used for operation providing that it can establish a Link signal. Thereafter, all Ethernet traffic upstream to and from the attached nodes is over port 1, with port 2 in standby mode. Normally, port 2 will be attached upstream and will have Link enabled, ready to go into operation at any time.

When there is a loss of Link (i.e. a loss of the link signal) on port 1, the ESD42 Dual-Homing Switch operates to move all of the traffic quickly to port 2. Thereafter, all Ethernet traffic upstream to and from the attached nodes is over port 2, with port 1 becoming available for back-up or standby after the fault is repaired and the Link signal on port 1 is enabled again. Once port 2 is in operation, it will stay in operation indefinitely . . . until it experiences a loss of Link, whereupon the ESD42 will move all of the traffic to port 1 to recover from the port 2 fault.

The signal for the ESD42 to switch traffic to the other dual-homing port is the loss of Link on the operating port. There are no configuration variables or set-up choices associated with the ESD42 Dual-Homing Switch. It is plug-and-play. The dual-homing switch-over time is a few milliseconds, during which time the ESD42 changes the state of its internal address buffers and notifies upstream devices of the change to the new operating port.

Advantageously, the operation of the ESD42 is the same, no matter what brand or model of Ethernet switch or switches is upstream. The dual-homing redundancy features of the ESD42 are consistent with industry-standard Ethernet and do not require GarrettCom's Magnum™ switches upstream. While GarrettCom has more thoroughly tested the ESD42 Dual-Homing Switch with Magnum™ Switches and S-Ring™ Redundancy Manager software and Link-Loss-Learn™ (LLL) and IEEE 803.1x Rapid Spanning Tree Protocol (RSTP) self-healing LAN software, some other Ethernet switch products have been tested and have been found to work as well.

A full recovery from the fault in the overall network is dependent upon the time used by the upstream switches to adjust to the movement of the nodes attached to the ESD42 from one connection port to another. In testing the ESD42 using some different brands of Ethernet switches running industry standard RSTP software, it has been found that this is usually less than a second. This rapid fault recovery is a substantially advantageous feature.

Figure 3:
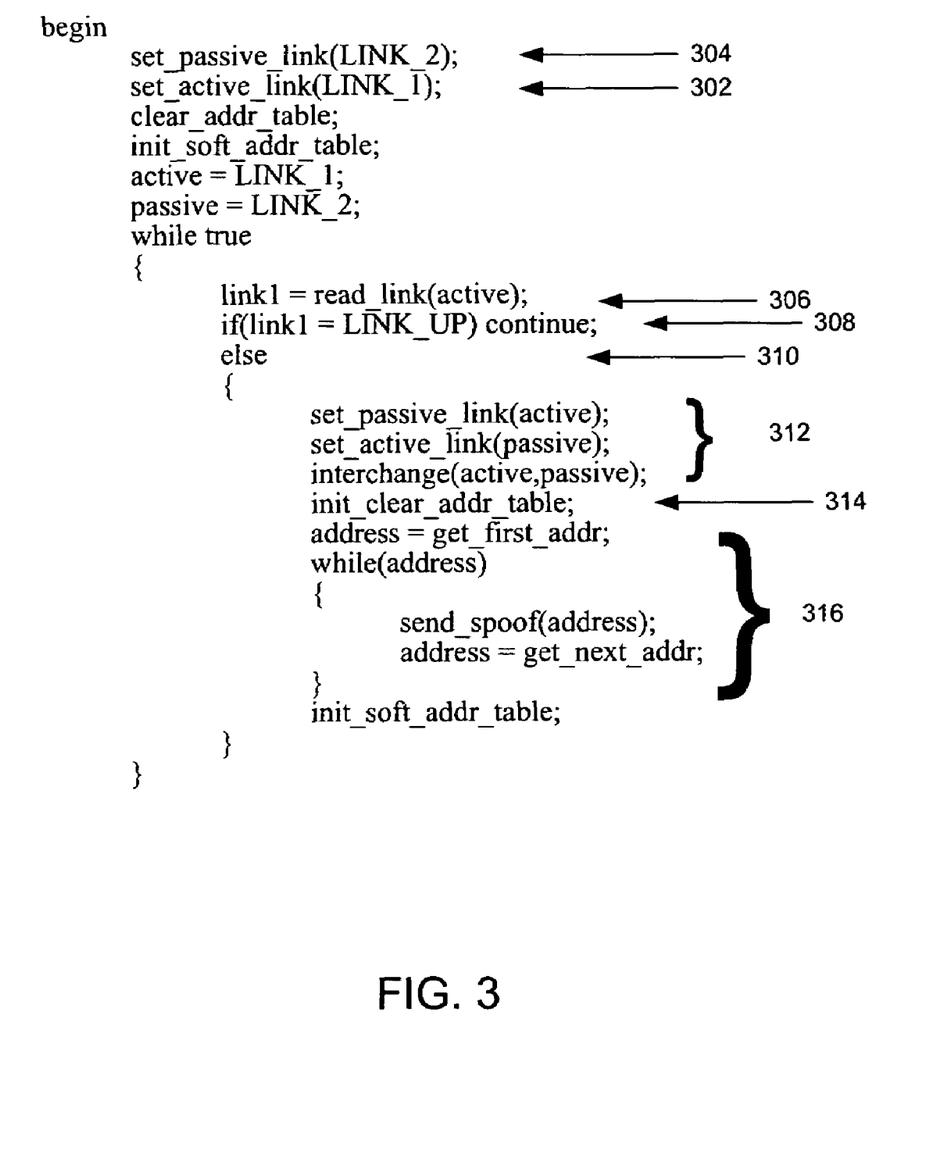
FIG. 3 shows example pseudo code for implementing dual-homing in a layer 2 switch in accordance with an embodiment of the invention.

FIG. 3 shows example pseudo code for implementing dual-homing in a layer 2 switch in accordance with an embodiment of the invention. As shown at the beginning of the pseudo code, a first link (LINK_1) is set 302 to be the active link (operational path), and a second link (LINK_2) is set 304 to be the passive link (standby path).

Within the main loop of instructions, the link signal on the currently active link is read 306, and if the link is up, then operation of the switch continues 308 without a switchover to the standby path. In alternate embodiments, the determination of whether a link is available to the upstream network on the currently active link may be performed by means other than by detecting the presence or absence of the ethernet link signal. In one alternate embodiment, this determination is made by detecting the presence or absence of a periodic "heartbeat" packet. In another alternate embodiment, this determination is made by detecting the presence or absence of traffic through the link. Other suitable techniques may also be employed.

However, if the link is down (i.e. the "else" case) 310, then the status of the links are interchanged 312 in that the currently active link is set to passive status, and the currently passive link is set to active status. The currently active link may be set to the passive state by setting the port to drop all data traffic, or by dropping the ethernet link signal, or by other suitable techniques. The currently passive link may be set to the active state by setting the port so that it no longer drops all data traffic, or by turning on the ethernet link signal, or by other suitable techniques.

In addition, the entire address table of the switch may be cleared 314 so that the switch re-learns which MAC addresses correspond to which ports. Alternatively, the switch may clear the address table and force a re-learn on the previously active port. In yet another alternate embodiment, the switch may move the learned addresses from the previously active port to the newly active port.

Furthermore, the switch sends 316 a "spoof" of each MAC address out of the newly active link so that devices upstream in the topology are informed that packets destined to these MAC addresses are to be sent to the newly active link (instead of the previously active link). Advantageously, such address "spoofing" makes sure that the traffic originating in the upstream network takes the correct path and so enables the rapid fault recovery. The address spoofing may be performed by copying the MAC addresses of the nodes and sending out broadcast or multicast packets to force the upstream network to learn the correct path for the addresses. Alternatively, a suitably coded protocol packet may be sent out of the newly active port to force the upstream network to learn the correct path for the addresses.

Application of Dual-Homing Layer 2 Switch in Ring Topology

Figure 4:
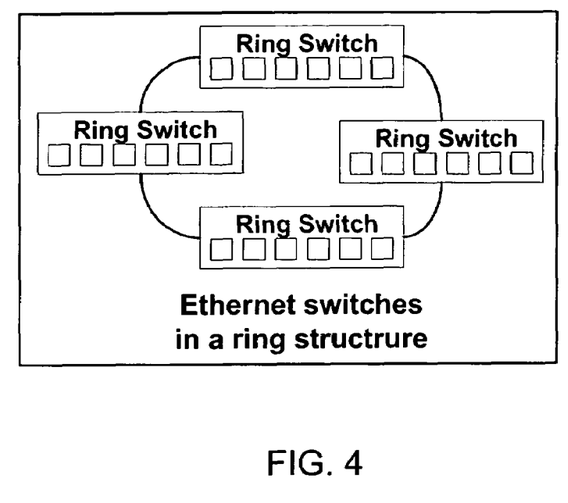
FIG. 4 depicts Ethernet switches in a conventional ring structure.
Figure 5:
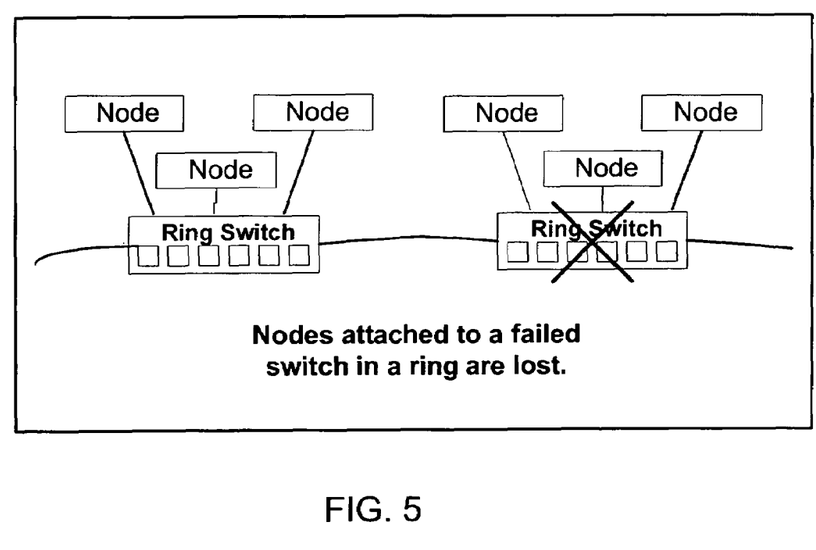
FIG. 5 depicts failure of a switch in a conventional ring structure.
Figure 6:
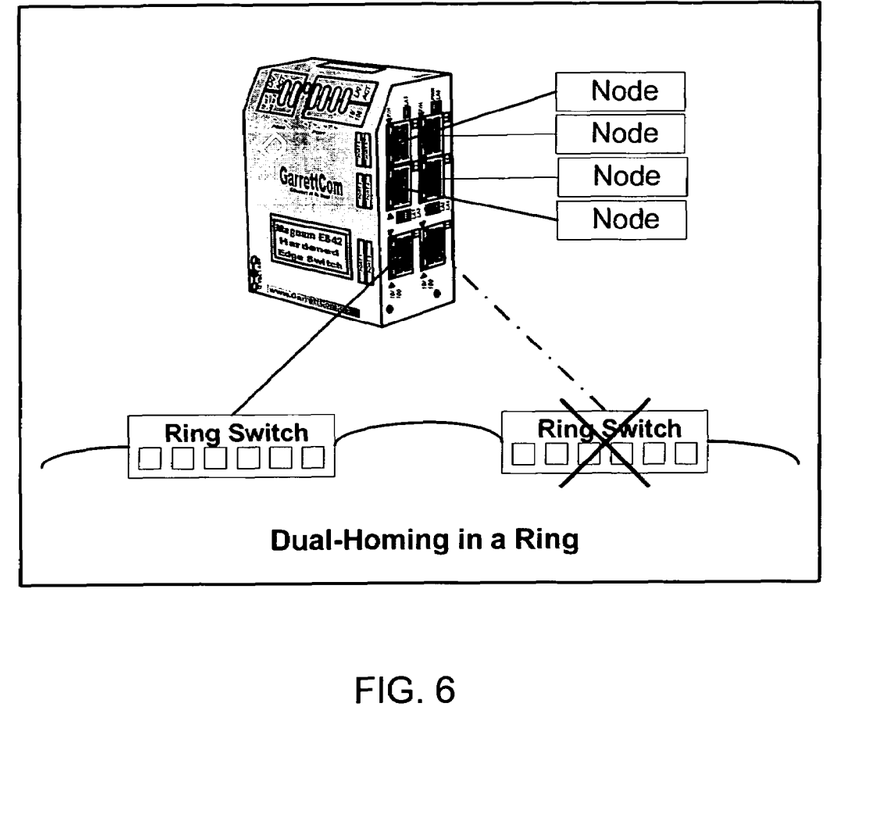
FIG. 6 depicts a network configuration where a dual-homing layer 2 switch is connected to two switches in a ring structure in accordance with an embodiment of the invention.

In industrial applications, popular redundant Ethernet LANs usually use a ring structure. FIG. 4 depicts an example of such a ring structure of Ethernet switches. A ring structure will recover from faults such as a ring media break or the failure of one switch in the ring. But, as depicted in FIG. 5, the failure of a switch in the ring takes down the nodes connected into that switch. Additional up-time for any given node can be increased by connecting it to two switches in the ring, so that the node's LAN connection is maintained even when there is a failure of either switch in the ring. Dual-Homing can do this, as shown by the configuration of FIG. 6, so as to achieve improved LAN connection time for critical nodes.

In evaluating the improvement in connection time in ring structures, it should be noted that use of a Dual-Homing Switch improves reliability in two ways. First, it uses two media connections into the LAN so that media faults cause less down-time. Second, the reliability of the little Dual-Homing Switch itself (which is a single point-of-failure for the attached nodes) is much greater that the reliability of a large managed Ethernet switch in the ring.

It should also be noted that a dual-homing layer 2 switch provides connection flexibility that provides maintenance and service options. In order to upgrade a switch in a ring or to load new software, it may need to be temporarily taken out of service on a planned basis. During a planned outage, dual-homing can maintain the connection of critical nodes in a redundant LAN, adding valuable up-time to overall operations and permitting service work to be done during normal work time.

Application of Dual-Homing Layer 2 Switch in Dual-Ring Topology

Figure 7:
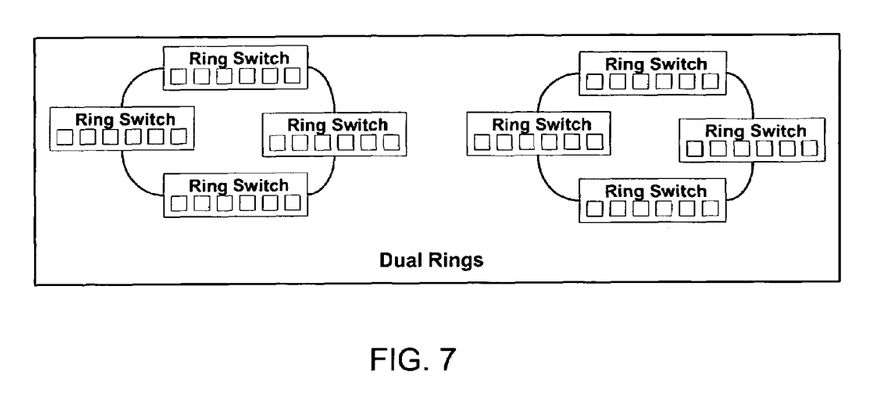
FIG. 7 depicts switches in a conventional dual-ring structure.

Single Ethernet rings can recover from only one fault at a time. Where up-time needs to be increased to levels above what can be achieved with a single ring, some LAN designs use two rings for greater redundancy. FIG. 7 depicts a conventional dual ring topology. With two rings, there are two paths for LAN traffic, providing the potential for recovery from more than one fault at a given time. Dual ring configurations can sometimes be achieved at little cost increase by breaking up a large ring into two smaller rings.

Figure 8:
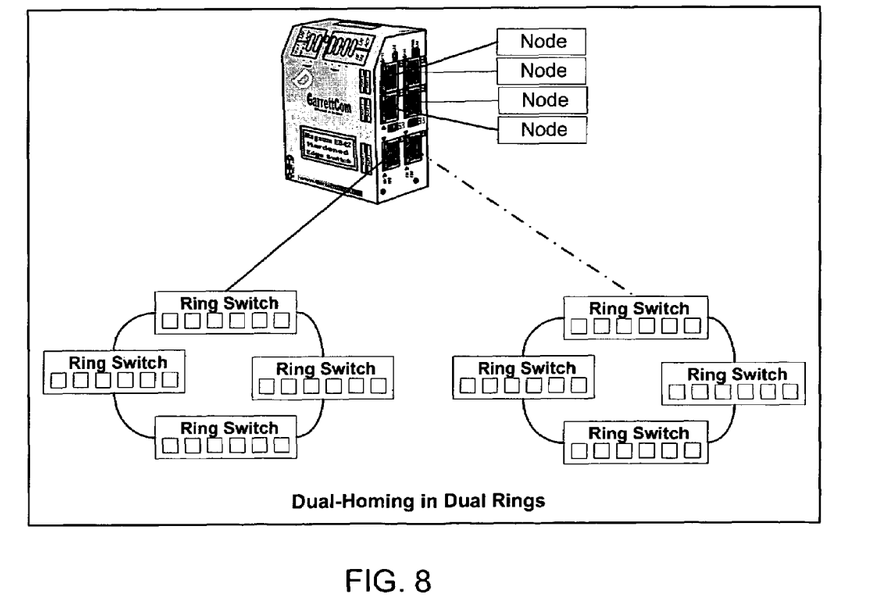
FIG. 8 depicts a network configuration where a dual-homing layer 2 switch is connected to one switch in each of two rings in accordance with an embodiment of the invention.

In a dual ring topology, dual-homing of selected high-availability nodes is highly desirable and is easily implemented by using a dual-homing layer 2 switch in accordance with an embodiment of the invention. Such a configuration is depicted in FIG. 8. The up-time requirements in these applications make cost considerations secondary. There have been a few special-purpose dual-homing PLCs and dual-NIC computers available, and these have often been called into service where complex dual ring LANs were being designed and used. Now, Dual-Homing Switches enable any Ethernet-enabled edge device with a single NIC to have the advantage of dual-homing up-time.

As shown in FIG. 8, to use a Dual-Homing ES42D Switch in a dual ring LAN, connect Port 1 into any switch in one ring and Port 2 into any switch in the other ring. The same fault-recovery logic as for single rings is used in handling fault conditions for Dual-Homing Switches used in dual ring LANs. Loss of Link on the Operating Port causes the Dual-Homing Switch to move all traffic on the upstream connection to the Standby Port, making it the Operating Port.

Application of Dual-Homing Layer 2 Switch in Mesh Structure

Figure 9:
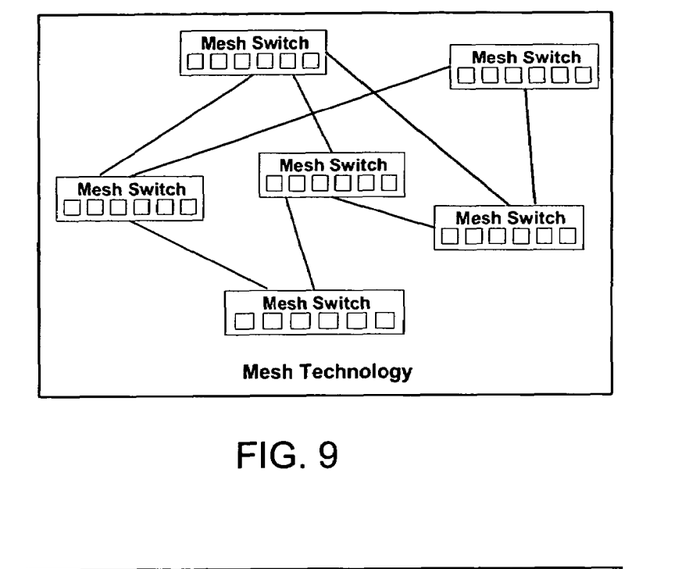
FIG. 9 depicts an illustrative mesh topology.

For redundant LAN structures more robust than rings, a mesh can provide advantages. FIG. 9 depicts an illustrative mesh topology. Meshes can be made very complex almost without limit, with many switches and multiple interconnects adding to the fault recovery capability to achieve operations even with multiple faults. Of course, the cost of the Ethernet LAN equipment and cabling used in constructing the mesh goes up as the complexity increases. If cost is no problem, meshes can be good solutions for high-availability networks.

Figure 10:
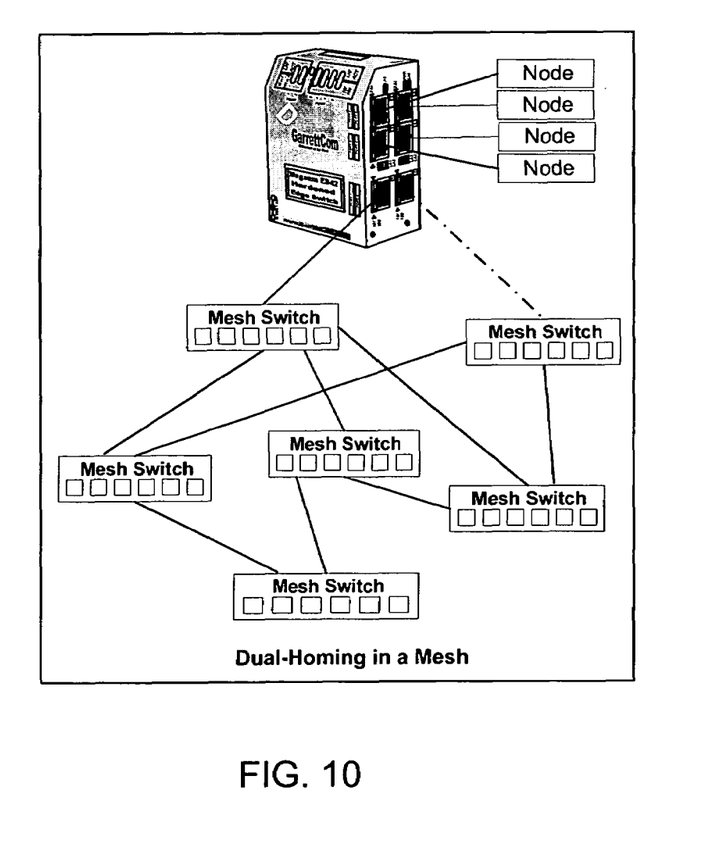
FIG. 10 depicts a dual-homing switch utilized in a mesh topology in accordance with an embodiment of the invention.

In a mesh structure, dual-homing provides the capability to insert selected critical nodes that are connected to two switches so as to maintain connectivity into the LAN even when one switch or one media link fails. FIG. 10 depicts a dual-homing switch utilized within a mesh topology in accordance with an embodiment of the invention. A simple mesh is sufficient to illustrate the principles of meshes for redundancy. The same fault-recovery logic in the dual-homing switch as for single ring and dual ring structures applies for meshes.

Of course, the connectivity and correspondingly increased up-time gain in a mesh is the same for a dual-homing switch as it is for any other switch in the mesh. Note that every switch in a mesh has at least two connections into the LAN, and can therefore support continued operation of its attached nodes if a connection switch or media fails. The reliability advantage of the Dual-Homing Switch in a mesh comes from the fact that it is a small, simple, inherently much more reliable device than the typical managed mesh switch.

Dual-Homing for Media Redundancy

Another useful application for a dual-homing switch is to provide for media redundancy. Where there is significant risk of media faults (for example, where the media is attached to a movable device and is flexed during normal operation, or where undependable wireless interconnects are utilized, or where part of the media path is exposed in a high-security situation), media redundancy adds essential connectivity uptime.

Figure 11:
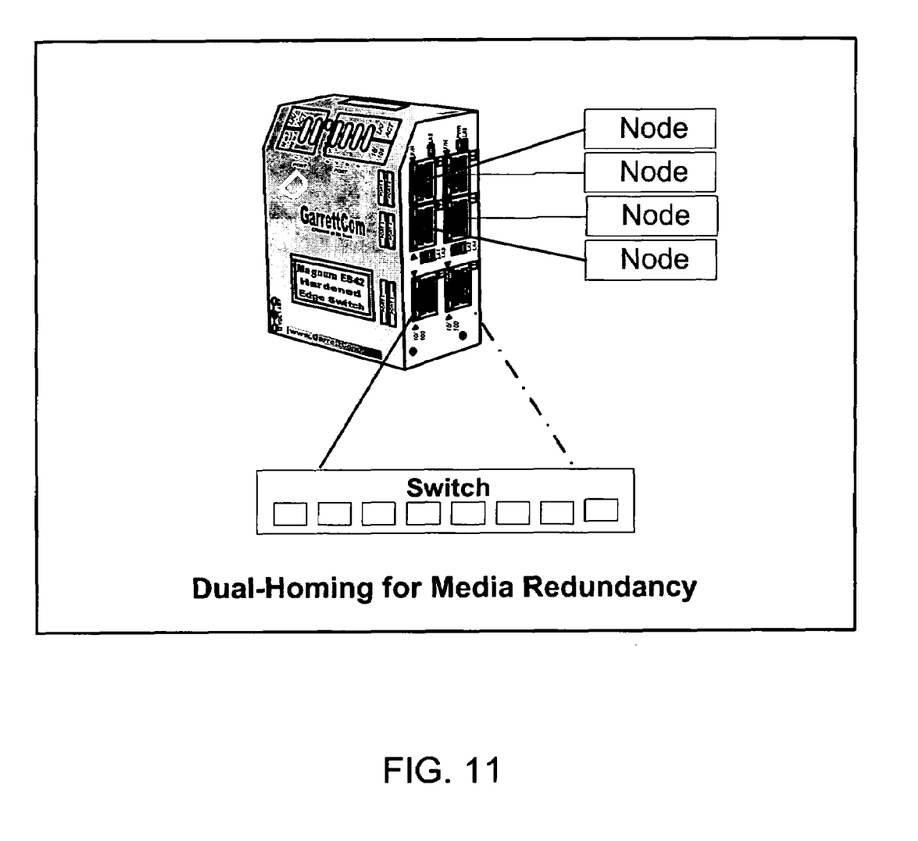
FIG. 11 depicts a dual homing switch utilized to provide for media redundancy in accordance with an embodiment of the invention.

FIG. 11 depicts an example configuration of a dual-homing switch utilized for media redundancy in accordance with an embodiment of the invention. For media redundancy, both ports 1 and 2 (the Operating Port and the Standby Port) are connected to the same switch upstream. Media types for ports 1 and 2 may be copper or fiber, may be the same or may be different, and different media types (such as wireless) may be inserted so long as the Link signal is passed through to provide a reliable signal for switchovers between the Operating and Standby Ports of the ESD42.

CONCLUSION

The present application discloses a dual-homing Ethernet Switch. Using such a switch, the dual-homing function may be advantageously moved from the node into the layer 2 switch. This enables the designer of redundant LANs to pick any industrial control device (i.e. node) that has an Ethernet port (not just those few designed with dual NICs configurable for dual-homing) and make it dual-homing for increased reliability and up-time.

Such a new Dual-Homing Switch provides a new plug-and-play redundancy tool, making new design options and choices available. Many more industrial SCADA (supervisory control and data acquisition) devices can now be used creatively in redundant LANs, and more robust LANs are made cost effective and less complex with this new tool.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of providing dual-homing in a layer 2 switch, the method comprising:
   determining whether a link is available to an upstream network on a currently active port; and
   if the link is unavailable, then a) performing a switchover such that the currently active port becomes a newly passive port, and a currently passive port becomes a newly active port, b) clearing entries in an address table of the layer 2 switch, and c) spoofing MAC addresses out of the newly active port.

2. The method of claim 1, wherein the determination of whether the link is available is performed by detecting a presence or an absence of an ethernet link signal.

3. The method of claim 1, wherein the determination of whether the link is available is performed by detecting a presence or an absence of a heartbeat type signal.

4. The method of claim 1, wherein the determination of whether the link is available is performed by detecting a presence or an absence of traffic through the link.

5. The method of claim 1, wherein the switchover is performed by setting the currently active port to drop traffic and by setting the currently passive port to not drop traffic.

6. The method of claim 1, wherein the switchover is performed by dropping a link signal on the currently active port and by turning on the link signal on the currently passive port.

7. The method of claim 1, wherein the clearing of entries in the address table is performed while moving addresses for downstream nodes coupled to the switch from being associated with the newly passive port to being associated with the newly active port.

8. The method of claim 1, wherein the clearing of entries in the address table forces the switch to re-learn addresses for downstream nodes coupled to the switch.

9. The method of claim 1, wherein said spoofing comprises copying addresses of downstream nodes coupled to the switch and sending broadcast or multicast packets out of the newly active port.

10. The method of claim 1, wherein said spoofing comprises sending a suitably coded protocol packet out of the newly active port so as to instruct the upstream network devices to learn a correct path for the addresses of the downstream nodes.

11. A network apparatus with layer 2 switching capabilities configured to provide dual-homing via two ports, the apparatus comprising:
   processor-executable code configured to determine whether a link is available to an upstream network on a currently active port; and
   processor-executable code configured, if the link is unavailable, to a) perform a switchover such that the currently active port becomes a newly passive port, and a currently passive port becomes a newly active port, b) clear entries in an address table of the layer 2 switch, and c) spoof MAC addresses out of the newly active port.

12. The apparatus of claim 11, wherein the determination of whether the link is available is performed by detecting a presence or an absence of an ethernet link signal.

13. The apparatus of claim 11, wherein the determination of whether the link is available is performed by detecting a presence or an absence of a heartbeat type signal.

14. The apparatus of claim 11, wherein the determination of whether the link is available is performed by detecting a presence or an absence of traffic through the link.

15. The apparatus of claim 11, wherein the switchover is performed by setting the currently active port to drop traffic and by setting the currently passive port to not drop traffic.

16. The apparatus of claim 11, wherein the switchover is performed by dropping a link signal on the currently active port and by turning on the link signal on the currently passive port.

17. The apparatus of claim 11, wherein the clearing of entries in the address table is performed while moving addresses for downstream nodes coupled to the switch from being associated with the newly passive port to being associated with the newly active port.

18. The apparatus of claim 11, wherein the clearing of entries in the address table forces the switch to re-learn addresses for downstream nodes coupled to the switch.

19. The apparatus of claim 11, wherein said spoofing comprises copying addresses of downstream nodes coupled to the switch and sending broadcast or multicast packets out of the newly active port.

20. The apparatus of claim 11, wherein said spoofing comprises sending a suitably coded protocol packet out of the newly active port so as to instruct the upstream network devices to learn a correct path for the addresses of the downstream nodes.

21. The method of claim 1, wherein an entire address table of the layer 2 switch is cleared if the link to the upstream network is unavailable.

22. The network apparatus of claim 11, wherein the network apparatus comprises infrastructure equipment and does not comprise terminal equipment.

* * * * *